United States Patent
Agrawal et al.

(10) Patent No.: US 6,356,891 B1
(45) Date of Patent: *Mar. 12, 2002

(54) IDENTIFYING INDEXES ON MATERIALIZED VIEWS FOR DATABASE WORKLOAD

(75) Inventors: Sanjay Agrawal; Surajit Chaudhuri; Vivek R. Narasayya, all of Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/629,412

(22) Filed: Aug. 1, 2000

Related U.S. Application Data

(63) Continuation-in-part of application No. 09/553,033, filed on Apr. 20, 2000.

(51) Int. Cl.[7] .............................................. G06F 17/30

(52) U.S. Cl. ................................... 707/2; 707/3; 707/5

(58) Field of Search .............................. 707/7, 103, 1, 707/2, 3, 4, 5

(56) References Cited

U.S. PATENT DOCUMENTS

| | | | | |
|---|---|---|---|---|
| 5,778,353 A | * | 7/1998 | Schiefer et al. ................ | 707/2 |
| 5,897,632 A | * | 4/1999 | Dar et al. ....................... | 707/2 |
| 5,913,206 A | | 6/1999 | Chaudhuri et al. ............. | 707/2 |
| 5,913,207 A | | 6/1999 | Chaudhuri et al. ............. | 707/2 |
| 5,926,813 A | | 7/1999 | Chaudhuri et al. ............. | 707/5 |
| 5,950,186 A | | 9/1999 | Chaudhuri et al. ............. | 707/2 |
| 5,960,423 A | | 9/1999 | Chaudhuri et al. ............. | 707/2 |
| 5,991,754 A | * | 11/1999 | Riatto et al. .................... | 707/2 |
| 6,026,390 A | * | 2/2000 | Ross et al. ...................... | 707/2 |
| 6,134,543 A | * | 11/2000 | Witkowski et al. ............. | 707/2 |
| 6,169,983 B1 | * | 1/2001 | Chaudhuri et al. ............. | 707/2 |

OTHER PUBLICATIONS

IEEE publication, Improving OLAP performance by multi-dimensional hierarchical clustering by V. Markl et al., pp. 165–177, Aug. 1999.*

IEEE publication, Augmented inherited multi-index structure for maintenance of materialized path query views, by Harmui Kuno et al., pp. 128–137, Feb. 1996.*

IEEE publication, Optimizing queries with materialized views, by Surjajit Chaudhuri et al, pp. 190–2000, Mar. 1995.*

(List continued on next page.)

Primary Examiner—Diane Mizrahi
(74) Attorney, Agent, or Firm—Watts, Hoffmann, Fisher & Heinke, Co., L.P.A.

(57) ABSTRACT

An index and materialized view selection wizard produces a fast and reasonable recommendation for a configuration of indexes, materialized views, and indexes on materialized views which are beneficial given a specified workload for a given database and database server. Candidate materialized views and indexes are obtained, and a joint enumeration of the combined materialized views and indexes is performed to obtain a recommended configuration. The configuration includes indexes, materialized views and indexes on materialized views. Candidate materialized views are obtained by first determining subsets of tables are referenced in queries in the workload and then finding interesting table subsets. Next, interesting subsets are considered on a per query basis to determine which are syntactically relevant for a query. Materialized views which are likely to be used for the workload are then generated along with a set of merged materialized views. Clustered indexes and non-clustered indexes on materialized views are then generated. The indexes, materialized views and indexes on materialized views are then enumerated together to form the recommended configuration.

54 Claims, 9 Drawing Sheets

OTHER PUBLICATIONS

Chang et al. (IEEE publication, Aug. 1998) discloses an extended query reformulation technique using materialized views: Dept. of Computer Science, Seoul National University, South Korea; Database and expert systems applications, Aug. 1998 ;pp. 931–936.*

Zhang et al. (IEEE publication, Apr. 1999) discloses materialized view evolution support in data warehouse environment, Dept. of Comp. Science Defence Force Acad., Canberra, ACT, Australia, Database systems for advanced applications, Proc. 6th International.*

Chen et al. (IEEE publication, Sep. 2000) discloses aggregate path index for incremental web view maintenance, Dept. of Computer Science, Worcester Polytech. Inst. MA, Advanced Issues of E–Commerce and Web Based Information Systems, 2000. WECWIS 2000, 2nd International.*

Copending Patent Application Ser. No.: 09/087,617, entitled "Index Merging for Database Systems",.

Copending Patent Application Ser. No.: 09/139,843, entitled "What–If Index Analysis Utility for Database Systems",.

Chaudhuri, S., et al., "An Efficient, Cost–Driven Index Selection Tool for Microsoft SOL Server", *Proceedings of the 23rd VLDB Conference, Athens, Greece*, 10 pages, (1997).

Chaudhuri, S., et al., "AutoAdmin "What–if" Index Analysis Utility", *Sigmod '98 Proceedings of ACM SIGMOD International Conference on Management of Data*, vol. 27, Issue 2, 367–378, (Jun., 1998).

* cited by examiner

| | |
|---|---|
| 301~ | LET $E_i$ DENOTE A TABLE-SUBSET CONSISTING OF i TABLES (i ≥1). LET S = $\{E_1\}$ BE THE SET OF ALL TABLE SUBSETS CONSISTING OF EXACTLY ONE TABLE SUCH THAT THE COST OF EACH TABLE SUBSET IN S ≥ C. |
| 302~ | k = 2; |
| 303~ | WHILE k <= MAX-TABLES |
| 304~ | G = $\{ E_k \}$ GENERATED BY EXTENDING $\{ E_{k-1} \}$ ∈ S SUBJECT TO THE CONDITION THAT $E_k$ IS GENERATED ONLY IF THERE IS A QUERY IN THE WORKLOAD THAT REFERENCES ALL TABLES IN $E_k$. |
| 305~ | FOR EACH TABLE SUBSET T ∈ G<br>    IF COST (T) ≥ C THEN S = S ∪ {T} |
| 306~ | k = k + 1 |
| 307~ | END WHILE |

FIG. 3

| | |
|---|---|
| 401 | LET S BE THE SET OF MATERIALIZED VIEWS OF INTEREST FOR THE WORKLOAD W. |
| 402~ | S = {} |
| 403~ | FOR i = 1 TO |W| |
| 404~ | LET $M_i$ = SET OF SYNTACTICALLY RELEVANT MATERIALIZED VIEWS PROPOSED FOR QUERY $Q_i$ |
| 405~ | C = FIND-BEST-CONFIGURATION ($Q_i$, $M_i$) |
| 406~ | S = S ∪ C; |
| 407~ | RETURN S |

FIG. 4

501~  $R_1 = C; S = \{\}$
502~  WHILE ($|R_1|$)
503~    INITIALIZE V' = {}. LET V' = THE SET OF MERGED VIEWS OBTAINED BY CALLING *MergeViewPair* (RULE 1) ON EACH PAIR OF VIEWS IN $R_1$
504~    IF V' = {} GOTO STEP 8          /* DONE WITH RULE 1 */
505~    $S = S \cup V'; R_1 = R_1 \cup V'$
506~    FOR EACH VIEW $v \subset V'$, REMOVE BOTH PARENTS OF V FROM $R_1$
507~  END WHILE
508~  $R_2 = C \cup S$
509~  WHILE ($|R2|$)
510~    INITIALIZE V' = {}. LET V' BE THE SET OF MERGED VIEWS OBTAINED BY CALLING *MergeViewPair* (Rule 2) ON EACH PAIR OF VIEWS IN $R_1$.
511~    IF V' = {} RETURN S
512~    $S = S \cup V'; R_2 = R_2 \cup V'$
513~    FOR EACH VIEW $v \subset V'$, REMOVE BOTH PARENTS OF v FROM $R_2$.
514~  END WHILE
515~  RETURN S.

FIG. 5

| | |
|---|---|
| 601~ | LET $V_1$ AND $V_2$ BE A PAIR OF MATERIALIZED VIEWS THAT REFERENCE THE SAME TABLES AND HAVE THE SAME WHERE CLAUSE |
| 602~ | LET V BE A VIEW OBTAINED BY TAKING THE UNION OF THE PROJECTION COLUMNS OF $V_1$ AND $V_2$ AND UNION OF THE GROUP BY COLUMNS OF $V_1$ AND $V_2$. |
| 603~ | IF $((|V| >$ Max Size (Parent-Closure($V_1$) $\cup$ Parent-Closure ($V_2$)) * x) RETURN NULL. |
| 601~ | RETURN V. |

FIG. 6

| | |
|---|---|
| 701~ | LET $V_1$ AND $V_2$ BE A PAIR OF MATERIALIZED VIEWS THAT REFERENCE THE SAME TABLES AND HAVE THE SAME JOIN CONDITION AND GROUP BY COLUMNS. |
| 702~ | LET V BE A VIEW OBTAINED BY PUSHING THE SELECTION CONDITION(S) OF $V_1$ AND $V_2$ INTO ITS PROJECTION (AND GROUP BY) COLUMN LIST AND TAKING THE UNION OF THE PROJECTION COLUMNS OF $V_1$ AND $V_2$. |
| 703~ | IF $((|V| >$ Max Size (Parent-Closure($V_1$) $\cup$ Parent-Closure ($V_2$)) * x) RETURN NULL |
| 704~ | RETURN V. |

FIG. 7

| | |
|---|---|
| 801. | Let $S_1 = \{T \mid T$ is a table-subset of size 1 satisfying $TS\text{-}Cost(T) \geq C\}$; $i = 1$ |
| 802. | While $i <$ MAX-TABLES and $\|S_i\| > 0$ |
| 803. |     $i = i + 1$; $S_i = \{\}$ |
| 804. |     Let $G = \{T \mid T$ is a table-subset of size i, and $\exists\ s \in S_{i-1}$ such that $s \subset T\}$ |
| 805. |     For each $T \in G$ |
| |         If $TS\text{-}Cost\ (T) \geq C$ Then $S_i = S_i \cup \{T\}$ |
| 806. |     End For |
| 807. | End While |
| 808. | $S = S_1 \cup S_2 \cup \ldots S_{\text{MAX-TABLES}}$ |
| 809. | $R = \{T \mid T \in S$ and $TS\text{-}Weight(T) \geq C\}$ |
| 810. | Return R |

FIG. 8

| | |
|---|---|
| 901. | Let $v_1$ and $v_2$ be a pair of materialized views that reference the same tables and the same join conditions. |
| 902. | Let $s_{11}, \ldots s_{1m}$ be the selection conditions that occur in $v_1$ but not in $v_2$. Let $s_{21}, \ldots s_{2n}$ be the selection conditions that occur in $v_2$ but not in $v_1$. |
| 903. | Let $v_{12}$ be the view obtained by (a) taking the union of the projection columns of $v_1$ and $v_2$ (b) taking the union of the GROUP BY columns of $v_1$ and $v_2$ (c) pushing the columns $s_{11}, \ldots s_{1m}$ and $s_{21}, \ldots s_{2n}$ into the GROUP BY clause of $v_{12}$ and (d) including selection conditions common to $v_1$ and $v_2$. |
| 904. | If ( $v_{12}$ > Min Size (Parent-Closure ($v_1$) ∪ Parent-Closure ($v_2$)) * x) Then Return Null. |
| 905. | Return $v_{12}$. |

1002. While ( |R| > 1 )

1003.     Let M' = The set of merged views obtained by calling *MergeViewPair* on each pair of views in R.

1004.     If M' = {} Return (R M)

1005.     R = R ∪ M'

1006.     For each view v ∈ M', remove both parents of v from R

1007. End While

1008. Return (R - M).

FIG. 10

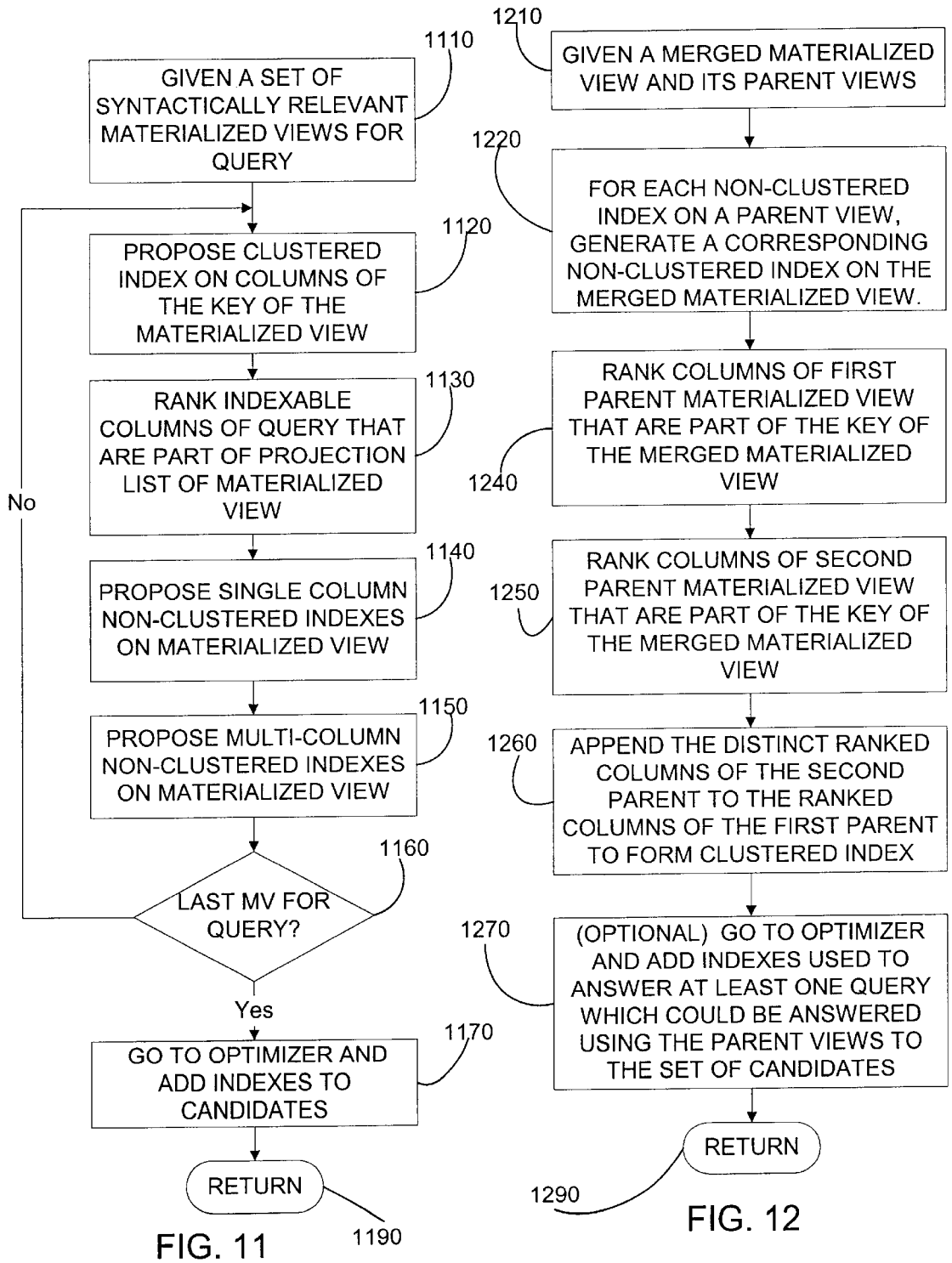

IDENTIFYING INDEXES ON MATERIALIZED VIEWS FOR DATABASE WORKLOAD

REFERENCE TO RELATED APPLICATIONS

This application is a continuation in part of pending U.S. patent application Ser. No. 09/553,033, filed Apr. 20, 2000; "Index and Materialized View Selection for a Given Workload. This application is related to co-pending patents and applications which are commonly assigned: "Database System Index Selection Using Cost Evaluation of a Workload for Multiple Candidate Index Configurations", U.S. Pat. No. 5,950,186; "Database System Index Selection Using Candidate Index Selection for a Workload", U.S. Pat. No. 5,960,423; "Database System Multi-Column Index Selection for a Workload", U.S. Pat. No. 5,913,206; "Database System Index Selection Using Index Configuration Enumeration for a Workload" U.S. Pat. No. 5,913,207; "Database System Index Selection Using Cost Evaluation of a Workload for Multiple Candidate Index Configurations" U.S. Pat. No. 5,926,813; "Index Merging for Database Systems" Ser. No. 09/087,617; "What-If Index Analysis Utility for Database Systems" filed Aug. 25, 1998, Ser. No. 09/139,843 now U.S. Pat. No. 6,223,171 which are hereby incorporated by reference.

FIELD OF THE INVENTION

This invention relates generally to the field of databases, and in particular to selection of indexes on materialized views for a given workload of queries to a database.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 2000, Microsoft Corporation, All Rights Reserved.

BACKGROUND

Databases have grown very large in size. When a user desires information, they issue a query, which asks for information, such as give me the names of people from Bozeman, Montana with income greater than a certain amount. There may be a table in a database containing a row for each person in the United States. Each row may have several columns, including income, social security number, street address, city, state, telephone number, names of dependents, occupation, etc. By searching this large table, a computer can find all the people in Bozeman, Montana, and then determine from that list of people, who has income greater than the specified amount. To do this search, the computer has to deal with the entire large table, retrieving it from storage into memory, and then searching row by row for the desired information.

One way to make this type of search more efficient, is to build indexes. An index is a subset of a table, which typically contains fewer columns than the table itself. Indexes are sometimes created prior to a user query being made. Some indexes are arranged in a tree like structure, such as a B+ tree, which makes finding information even faster. If an index exists that contains the data that the user desires, it is much easier to simply search the index to provide the information.

In the case of the above query, an index could be generated based on State, and then people in Montana could be quickly identified. This index would be much smaller than the table, and the answer could be provided much more quickly because the entire table does not need to be searched. An index with income can also be generated to quickly identify people with income greater than the specified amount An index on city could also be created to quickly identify people in the city of Bozeman. In each of these cases, the table would have to be consulted absent further relevant columns in the index.

A covering index for a query may be used. A covering index for a query is an index that is a subset of the large table, yet has at least all the columns from a table needed to answer the query. For the example query, an index having city, state, people and income columns would be a covering index because it has all the columns needed to answer the query without resort to the table.

A further way to improve the performance of a query is to use a materialized view. A materialized view is sometimes referred to as an indexed view in some database products. It is some view of the data, such as the results of a query, which have been materialized. A materialized view may not be directly tied to a query. A materialized view has some characteristics that a traditional index does not have. Materialized views may be defined over multiple tables, and can have selections and group-by over multiple columns. It can have selection and grouping of columns. As with traditional indexes, materialized views also incur an overhead each time the tables referenced in the materialized view are updated. It can also provide a dramatic performance improvement. On the other hand, a traditional index may be applicable more broadly to different queries in the workload.

Using the example above, a very good materialized view would comprise a list of people in Bozeman, Montana with at least the specified income. However, if a new person moves to Bozeman, Montana having at least the specified income, the materialized view needs to be updated.

A workload is a set of queries and updates which are run against a given database. A configuration is a set of traditional indexes, materialized views and indexes on materialized views which may be used in the execution of the workload. Given a workload of multiple queries, the decision as to which indexes and materialized views to include in a configuration of indexes and materialized views is very complex and time consuming. Since there is overhead associated with generating, maintaining and storing the indexes and materialized views, this must be offset against the benefit obtained by using them.

A query optimizer is used to obtain information about indexes and materialized views given a set of queries. Optimizers are database components that generate an optimized plan for each query and an associated cost for that query. They can take a representative workload, and return information of a plan of execution for each query in the workload, as well as information about the cost of execution. The optimizer provides detailed information in the form of a tree which has nodes corresponding to a plan of execution of the query. The nodes provide information on the data structures used, and the cost of using them. From this cost information, a user can try to determine which indexes and materialized views should be built or used to enable the workload to be processed in an efficient manner.

One way of determining which set of indexes and materialized views provides the most benefit given a workload is to actually propose a set of indexes and materialized views, build them, and then run the workload. The total cost of the workload is then calculated. Several different sets of indexes and materialized views are measured in this manner to find the best set. This is a very expensive proposition since the space of materialized views and indexes is extremely large. In addition, building them can be very expensive due to updates and storage constraints. Selecting materialized views is also intertwined with the selection of indexes, adding to complexity. As the workload changes, the entire process must be repeated to arrive at a new set of indexes and materialized views and indexes on materialized views.

Prior attempts at materialized view selection typically assume that a set of materialized views which are likely to be of benefit is pre-specified, and they focus only on the "search" problem of picking an attractive set of materialized views among these views. The attractive set of materialized views can be referred to as a set of candidate materialized views. Candidate materialized views may be thought of as a set of materialized views such that a search on them preserves most of the gains of searching the entire space of possible materialized views at a fraction of the cost. The prior attempts assume that the space of candidate materialized views is synonymous with the space of syntactically relevant materialized views, which are essentially all materialized views which could be used for the workload. This approach is not scalable for reasonably large workloads since the space of syntactically relevant materialized views is so large that known materialized view enumeration schemes are computationally infeasible. Moreover, most previous work does not consider materialized views with selections. Adding to the complexity of selecting materialized views, is that they may be defined over multiple tables, and can have selections and group-by over multiple columns.

Finally, the prior attempts focus exclusively on materialized views but do not address a key issue of balancing the choice of indexes and materialized views. For any single query, a materialized view that matches the query can speed up execution of the query dramatically, and an index on the materialized view can further speed up execution of the query. On the other hand, a traditional index may be applicable more broadly, and of benefit to multiple different queries. Thus, it is difficult to strike that balance and select the right combination of indexes and materialized indexes and indexes on materialized views.

SUMMARY OF THE INVENTION

A set of interesting indexes on materialized views to consider for a configuration to optimize execution of a database workload are generated. Clustered and non-clustered indexes on materialized views are generated. Given a set of syntactically relevant materialized views, a set of indexes is proposed for each view M. All indexes on M are proposed on one or more projection columns of M. A clustered index on the columns in the key of the view on M is selected. Indexable columns in M are ranked based on how they are referenced in the query, and ordered accordingly.

Single column and multicolumn non-clustered indexes are also selected. After materialized views and indexes on each materialized view are selected, a query optimizer is used to indicate which views and indexes on the views would be used to answer the query. If an index on a column that appears in the projection list of the query is selected over a clustered index, the clustered index is changed so that it has a permutation of columns in the chosen index.

Indexes are also proposed on merged views. All non-clustered indexes for parent views are also proposed on the merged view. A clustered index is proposed on the key of the merged view. Projection columns in the clustered index are ranked and ordered from a first parent. The same ranking is performed for a second parent. The ranked projection columns for the second parent are then appended to the columns from the first parent. Preference for ranking the projection columns of one parent prior to another parent may be done on a higher cost or benefit basis.

The indexes on materialized views are combined to form a set of candidate indexes. The set of candidate indexes on materialized views is provided to an enumerator together with the set of materialized views and a set of indexes for selection of a configuration to recommend for the workload.

BRIEF DESCRIPTION OF THE DRAWINGS

FIG. 3 is a pseudocode representation of the pruning of uninteresting table sets.

FIG. 4 is a pseudocode representation of using cost information to identify materialized views of interest.

FIG. 5 is a pseudocode representation of generating a new set of merged materialized views from a given set of materialized views.

FIG. 6 is a pseudocode representation of merging pairs of materialized views using a first rule.

FIG. 7 is a pseudocode representation of merging pairs of materialized views using a second rule.

FIG. 8 is a pseudocode representation of finding interesting table-subsets in a workload.

FIG. 9 is a pseudocode representation of a further embodiment of merging pairs of materialized views.

FIG. 10 is a pseudocode representation of generating a set of merged views from a given set of views.

FIG. 11 is a flow chart representation of selecting indexes on materialized views.

FIG. 12 is a flow chart representation of selecting indexes on merged materialized views.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. A first section describes the operation of a computer system which implements the current invention. This is followed by a high level architectural description of how materialized views are proposed for a given workload. Further sections provide detail on merging of materialized views and final selection of a set of materialized views and indexes. A conclusion discusses further embodiments and benefits which may be provided by the invention depending on the implementation.

Hardware and Operating Environment

Figure 1:
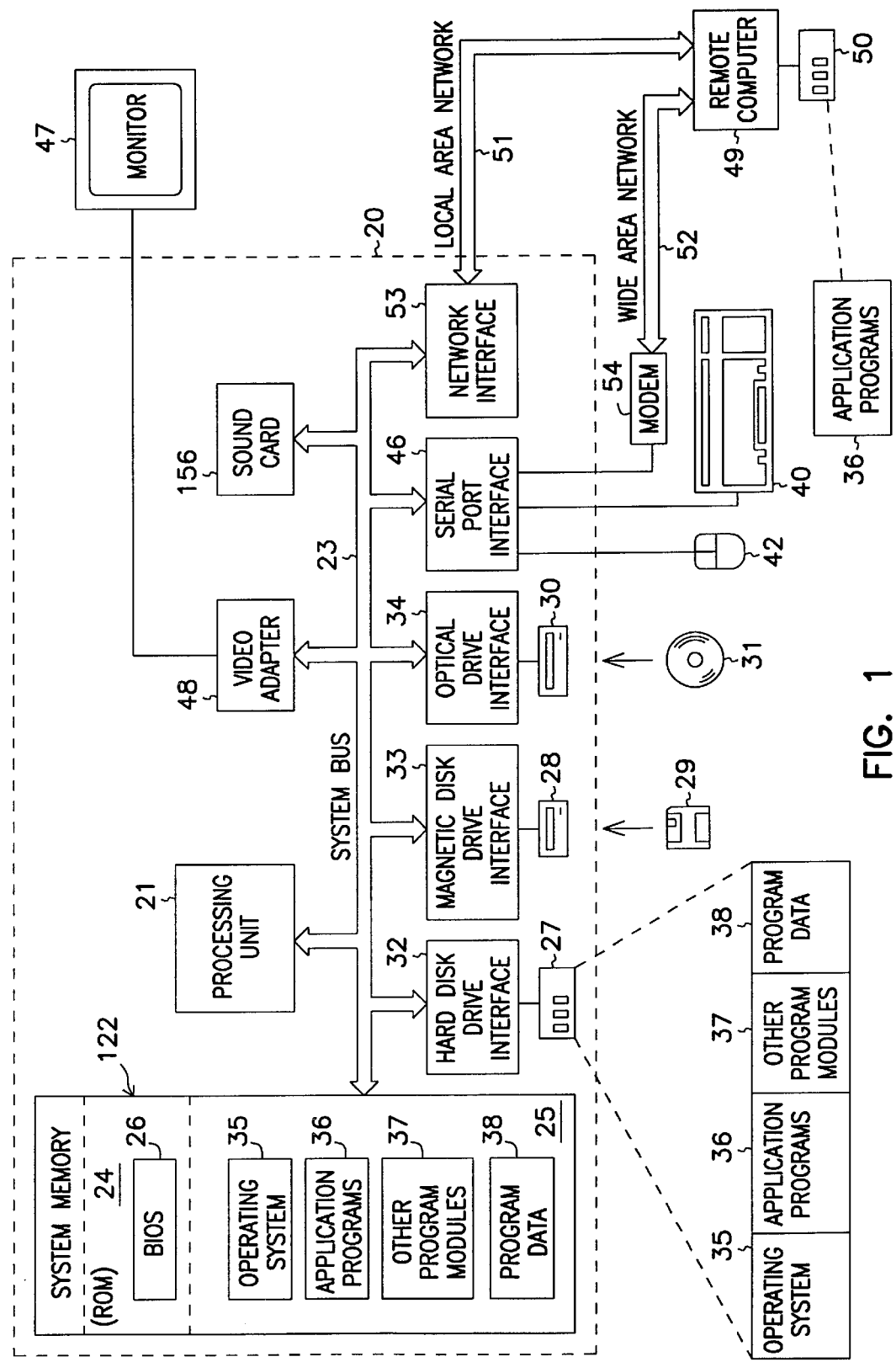
FIG. 1 is a block diagram of a computer system on which the present invention may be implemented.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

Overview

Figure 2:
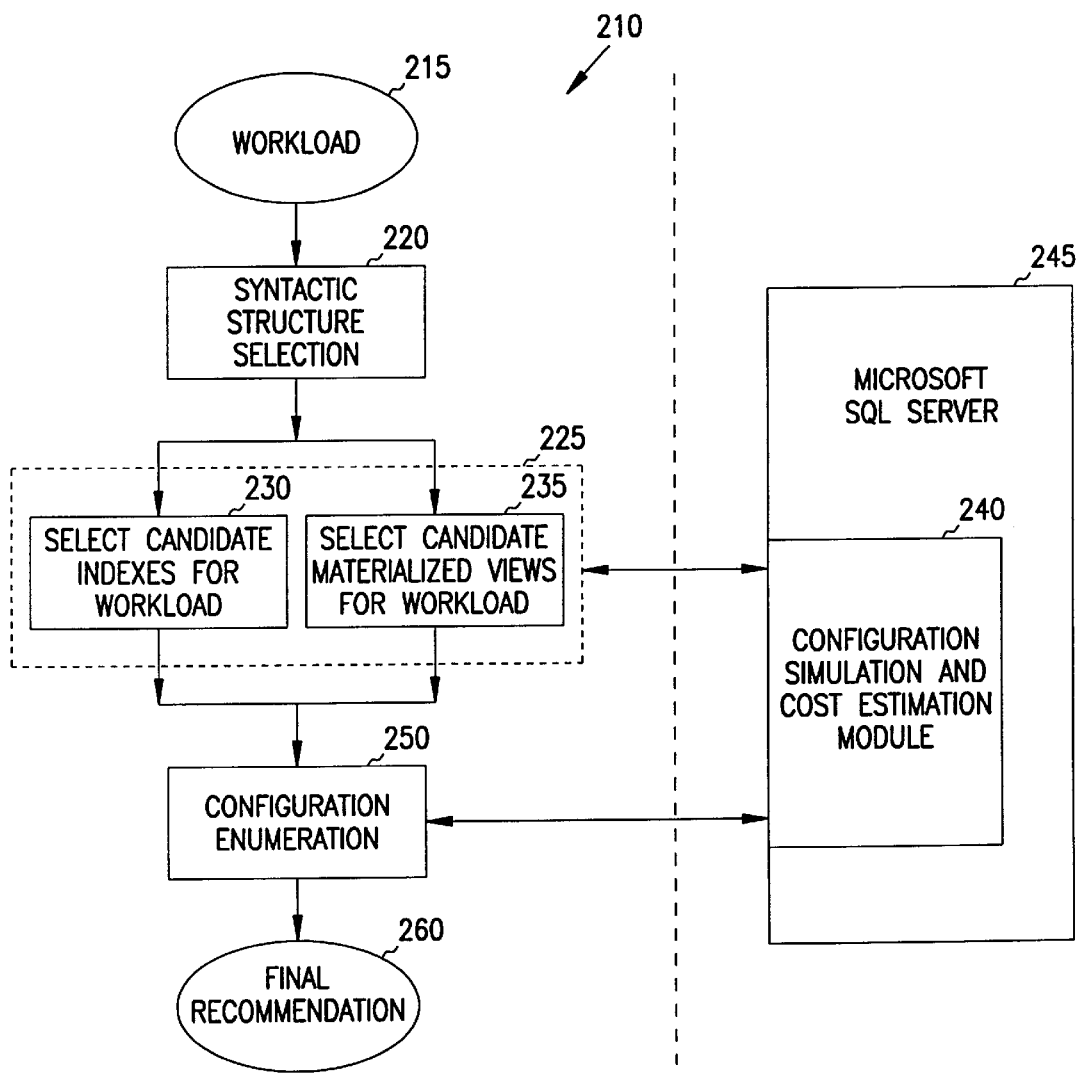
FIG. 2 is a block diagram of the architecture of an index and materialized view tuner.

An architectural overview of index and materialized view selection is shown in FIG. 2 generally at 210. A representative workload 215 is either estimated by a database administrator, or comprises actual workload measured. One way to obtain such a workload is to use logging capabilities of modem database systems to capture a trace of queries and updates faced by the system. Alternatively, customer or organization specific benchmarks can be used. A syntactic structure selection module 220 or program receives the workload 215 as input. Given workload 215, syntactically relevant indexes, materialized views, merged materialized views and indexes on materialized views that can potentially be used to answer the query are generated at module 220. This can be illustrated by the following example which identifies data to be retrieved from a sales table in a database. Given a query Q: Select Sum (Sales) From Sales_Table Where City='Seattle'. For the query Q, the following materialized views are syntactically relevant: $V_1$: Select Sum (Sales) From Sales_Table Where City='Seattle'. $V_2$: Select City, Sum (Sales) From Sales_Table Group By City. $V_3$: Select City, Sales From Sales_Table. Note that additional indexes on the columns of the materialized view may also be considered. Like indexes on base tables, indexes on materialized views can be single-column or multi-column. Moreover, these indexes can either be clustered or non-clustered, with the restriction that a given materialized view can have at most one clustered index on it. In one embodiment, a class of single-block materialized views consisting of selection, join, grouping and aggregation is considered. However, the workload may consist of arbitrary SQL statements. Candidate materialized views that can be exploited using back-joins by an optimizer may also be considered in further embodiments.

Searching the space of all syntactically relevant indexes, materialized views and indexes on materialized views for a workload is infeasible in practice, particularly when the workload is large or has complex queries. Therefore, it is crucial to eliminate spurious indexes and materialized views from consideration early, thereby focusing the search on a smaller, and interesting subset. A candidate selection module 225 identifies a set of traditional indexes at 230 and materialized views at 225 that are interesting for the given workload. Some ways of selecting candidate indexes is described in further detail in several co-pending applications: "Database System Index Selection Using Cost Evaluation of a Workload for Multiple Candidate Index Configurations", U.S. Pat. No. 5,950,186; "Database System Index Selection Using Candidate Index Selection for a Workload", U.S. Pat. No. 5,960,423; "Database System Multi-Column Index Selection for a Workload", U.S. Pat. No. 5,913,206; "Database System Index Selection Using Index Configuration Enumeration for a Workload" U.S. Pat. No. 5,913,207; "Database System Index Selection Using Cost Evaluation of a Workload for Multiple Candidate Index Configurations" U.S. Pat. No. 5,926,813, which were previously incorporated by reference. Many other ways of selecting such indexes may be used as desired to provide a list or set of candidate indexes. The selection of candidate materialized views will be described in further detail below.

Candidate selection module 225 works with a configuration and simulation cost estimation module of optimizer 240, which is a component of a database server 245 such as Microsoft® SQL Server. Module 240 provides cost information regarding candidates relative to the workload and the server. It also identifies which indexes and materialized views would be likely to be used on a given query. The likely to be used materialized views are selectively merged to form a set of merged materialized views. The merged materialized views are combined with the likely to be used materialized views to form a candidate set of materialized views. The candidate set will be further explored at an enumeration module 250. A search is performed among these structures to determine the ideal physical design, henceforth called a configuration, which consists of a set of traditional indexes, materialized views and indexes on materialized views.

Despite the remarkable pruning achieved by the candidate selection module 225, searching through this space in a naïve fashion by enumerating all subsets of structures is infeasible. In one embodiment, a greedy algorithm returns a configuration consisting of a total of k indexes and materialized views. It first picks an optimal configuration of size up to m ($\leq$k) by exhaustively enumerating all configurations of size up to m. It then adds the remaining indexes and materialized views greedily, i.e., in each subsequent step of the algorithm, the index or materialized view with the highest benefit relative to configuration already picked thus far is added. Configuration enumeration is performed over the joint space of indexes and materialized views.

The configurations considered by the enumeration module are compared for goodness by taking into account the expected impact of the proposed configurations on the total cost of the queries in the workload, computed as the sum of the cost of queries in the workload as provided by cost estimation module 240. The cost estimation module is responsible for providing this support. For one embodiment, cost estimation is provided at the server 245 by module 240. The module simulates the presence of indexes and materialized views that do not exist (referred to as "what-if" materialized views and indexes) to a query optimizer which is common in database servers. The optimizer also computes the cost of Q when given a query Q and a configuration C. Further details regarding simulation of what-if structures is provided in Chaudhuri S., Narasayya V., AutoAdmin "What-If" Index Analysis Utility. Proceedings of ACM SIGMOD 1998, which is hereby incorporated by reference for such details, and co-pending patent application: "What-If Index Analysis Utility for Database Systems" filed Aug. 25, 1998, Ser. No. 09/139,843 now U.S. Pat. No. 6,223,171 which is hereby incorporated by reference.

Candidate Materialized View Selection

Considering all syntactically relevant materialized views of a workload for enumeration at 235 is not scalable since it would explode the space of configurations that must be enumerated. The goal of candidate materialized view selection is to quickly eliminate spurious materialized views from further consideration, i.e., materialized views that are syntactically relevant for one or more queries in the workload, but are unlikely to be used in answering any query. This task is challenging for several reasons. First, the space of syntactically relevant materialized views for a query is very large, since in principle, a materialized view can be proposed on any subset of tables in the query. Furthermore, even for a given table-subset (a subset of tables referenced in a query in the workload), there is an explosion in the space of materialized views arising from selection conditions in the query. If there are m selection conditions in the query on a table-subset T, then materialized views containing any combination of these selection conditions is possible. Second, the obvious approach of selecting one candidate materialized view per query that exactly matches each query in the workload does not work since: (a) The language of materialized views may not match the language of queries. For example, nested sub-queries can appear in the query but may not be part of the materialized view language. (b) For a large workload, ignoring commonality across queries in the workload can result in sub-optimal quality. This can happen when storage is constrained since only a few materialized views can be picked. As a result, only a few queries in the workload are benefited.

One approach to candidate materialized view selection is driven by the following observations. First, there are certain table-subsets referenced in the workload such that, even if materialized views were proposed on those subsets it could only lead to a small benefit for the entire workload. This can happen either because the table-subsets occur infrequently or they occur only in inexpensive queries. In other words, the total cost of the queries associated with the table-subsets is a small fraction of the total cost of the workload. This is illustrated by the following example:

EXAMPLE 1

Consider a workload of 100 queries whose total cost is 1,000 units. Let T be a table subset that occurs in 25 queries whose total cost is 50 units. Then even if all syntactically relevant materialized views on T are considered, the maximum possible benefit of those materialized views for the workload is 5%.

Second, even among table-subsets that occur frequently or occur in expensive queries, not all table-subsets are likely to give the same benefit. Some tables subsets may cover only a limited number of rows, and it would be almost as efficient not to pre-compute a materialized view for tables. This is illustrated by the following example.

EXAMPLE 2

Consider the TPC-H 1 GB database and the workload specified in such benchmark. There are several queries in which the tables, lineitem, orders, nation, and region co-occur. However, it is likely that materialized views proposed on the table-subset {lineitem, orders} are more useful than materialized views proposed on {nation, region}. This is because the tables lineitem and orders have 6 million and 1.5 million rows respectively, but tables nation and region are very small (25 and 5 rows respectively); and hence the work saved by pre-computing the portion of the queries involving nation, and region is insignificant compared to pre-computing the portion of the query involving lineitem, and orders.

Third, it is not sufficient to consider candidate materialized views for individual queries, but a class of materialized views that can service multiple queries in the workload should be considered. The following simplified example of $Q_1$ from the TPC-H benchmark illustrates this point:

EXAMPLE 3

Consider a workload consisting of 1000 queries of the form: Select 1_returnflag, 1_linestatus, Sum (1_quantity) From lineitem Where 1_shipdate between <Date1> and <Date2> Group By 1_returnflag, 1_linestatus.

Assume that in each of the 1000 queries, there are different constants for <Date1> and <Date2>. Then, rather than recommending 1000 materialized views, the following materialized view that can service all 1000 queries may be more attractive for the entire workload. Select 1_shipdate, 1_returnflag, 1_linestatus, Sum (1_quantity) From lineitem Group By 1_shipdate, 1_returnflag, 1_linestatus Based on these observations, the task of candidate materialized view selection uses three steps: (1) From the large space of possible table-subsets that are potentially relevant for the workload, a smaller set of interesting table-subsets is selected. (2) Based on these interesting table-subsets, a set of syntactically relevant materialized views for each query in the workload is selected, and from this set a configuration that is best for that query is selected. A cost based analysis is used for selecting the best configuration for a query. Finally (3) the materialized views selected in (2), and based on commonality across these materialized views, are analyzed to generate an additional set of "merged" materialized views that can service multiple queries. The new set of materialized views proposed in (3) along with the materialized views selected in (2) forms the final set of candidate materialized views.

Finding Interesting Table-Subsets

As explained above, the space of possible table-subsets for a query, and hence the workload, can be very large. One embodiment efficiently finds table-subsets such that materialized views proposed on those table-subsets are likely to significantly benefit the workload. Example 2 illustrates the importance of being able to rank the table-subsets by "importance", and picking only the most important ones for proposing materialized views. However, the naive approach of looking at all subsets and sorting them by importance is infeasible for large or complex workloads, since the number of table-subsets for a given query is very large. Therefore, even before table-subsets can be ranked by importance, a large number of "uninteresting" table-subsets are eliminated from consideration (see Example 1). The algorithm for finding interesting table subsets for a workload is divided into two phases:

Phase 1: Returns a set S from which "uninteresting" table-subsets from the space of all possible table-subsets have been eliminated. A table-subset is "uninteresting" if proposing materialized views on it can lead to only a small benefit for the workload.

Phase 2: Rank the table-subsets in S by expected importance. The metric used for ranking the table-subsets in this phase can be different than the one used in Phase 1.

Each of these phases is now described in more detail.

Eliminating Uninteresting Table-Subsets from the Workload

Uninteresting subsets are quickly eliminated without having to look at all possible table-subsets for the workload. FIG. 3 outlines the algorithm that drives Phase 1 generally at 300. Cost(T) is defined to be the total cost of all queries in the workload where table-subset T occurs. The cost of a query is obtained from the cost estimation module 240 shown in FIG. 2. In one embodiment, this cost is the optimizer-estimated cost of the query for the current database. Note that the Cost function is monotonic: For table subsets $T_1$, $T_2$, $T_1$, $\subset T_2 \rightarrow \text{Cost}(T) \geq \text{Cost}(T)$. This is because, in all queries where the tables A, B and C are referenced, tables A and B are also referenced (and similarly other subsets of {A, B, C}). The above cost function captures the intuition that if a table subset is uninteresting, any extension of that table subset with additional tables is also likely to be uninteresting. At 301 a table subset, $E_i$ is defined as consisting of a set of i tables where $i \geq 1$. S is also defined as the set of all tables subsets consisting of exactly one table, such that the Cost of each tables subset in S is $\geq C$. At 302, k is initialized to two. At 303, MAX-TABLES is the maximum number of tables referenced in any query in the workload, and while k is less than or equal to MAX-TABLES, 304–306 are performed. At 304, a set G is defined as the set $E_k$, which is generated by extending $\{E_{k-1}\}$ as an element of S subject to the condition that $E_k$ is generated only if there is a query in the workload the references all tables in $E_k$. At 305, For each instance where T is an element of G, if Cost(T) is greater than or equal to C, then S is defined as the union of the previous S with T. C is a predetermined cost threshold that controls the degree of pruning. A lower threshold leads to a larger space being considered and vice versa. In one embodiment, a 10% cost cut off is used as near optimal in quality (compared to the case when there is no cut off), but significantly faster. At 306, k is incremented to consider further subsets. If MAX-TABLES is exceeded, consideration ends at 307, and a set of interesting table-subsets is returned.

Ranking Table-Subsets

In Phase 1 the set of all possible table-subsets was pruned by eliminating those subsets whose Cost(T) metric was below a specified threshold. The goal of Phase 2 is to rank the remaining table-subsets by a measure that captures the relative importance of table-subsets in reducing the total cost of the workload. Note that although the monotonicity property of the Cost(T) metric allowed avoiding looking at all subsets, it is not a good measure of relative importance of a table-subset. Continuing on Example 2, if all queries in the workload referenced the tables lineitem, orders, nation, and region together, then the table-subsets {lineitem, orders} would have the same importance as the table-subset {nation, region} using the Cost(T) metric. This emphasizes the need for a different cost-metric for ranking the table-subsets in Phase 2. Therefore, to be able to rank table-subsets by expected benefit, the following metric that captures the expected usefulness of a table-subset is defined:

Weight$_T$=$\Sigma_i$(Cost(Q$_i$)*($\Sigma$ sizes of tables in T)/($\Sigma$ sizes of all tables referenced in Q$_i$))

Table-subsets are ranked based on their weights. From this sorted list, table-subsets are picked until a predetermined threshold (k) of the total weight of all table subsets is exceeded. A value of k=50% is used in one embodiment. Other values may be used as desired with varying performance.

Finding Interesting Table-Subsets

An alternative algorithm is to find "interesting" table-subsets from among all possible table-subsets for the workload, and restrict the space of materialized views considered to only those table-subsets. Intuitively, a table-subset T is interesting if materializing one or more views on T has the potential to reduce the cost of the workload significantly, i.e., above a given threshold. Thus, the first step is to define a metric that captures the relative importance of a table-subset.

Consider the following metric: TS-Cost(T)=total cost of all queries in the workload (for the current database) where table-subset T occurs. The above metric, while simple, may not be a good measure of relative importance of a table-subset. For example, if all queries in the workload referenced the tables lineitem, orders, nation, and region together, then using the TS-Cost(T) metric, the table-subsets $T_1$={lineitem, orders} would have the same importance as the table-subset $T_2$={nation, region} even though a materialized view on $T_1$ is likely to be much more useful than a materialized view on $T_2$. Therefore, the following metric better captures the relative importance of a table-subset: TS-Weight(T)=$\Sigma_i$ Cost(Q$_i$)*(sum of sizes of tables in T)/(sum of sizes of all tables referenced in Q$_i$)), where the summation is only over queries in the workload where T occurs. Observe that TS-Weight is a simple function that can discriminate between table-subsets even if they occur in exactly the same queries in the workload.

Although TS-Weight(T) is a reasonable metric for relative importance of a table-subset, there does not appear to be an obvious efficient algorithm for finding all table subsets whose TS-Weight exceeds a given threshold. In contrast, the TS-Cost metric has the property of "monotonicity" since the table subsets $T_1$, $T_2$, $T_1 \subseteq T_2 \rightarrow$ TS-Cost($T_1$)$\geq$TS-Cost($T_2$). This is because in all queries where $T_2$ occurs, $T_1$ (and likewise all other subsets of $T_2$) also occur. This monotonicity property of TS-Cost allows leveraging of efficient algorithms proposed for identifying frequent itemsets, to identify all table-subsets whose TS-Cost exceeds the specified threshold. Fortunately, it is also the case that if TS-Weight(T)$\geq$C (for any threshold C), then TS-Cost(T) $\geq$C. Therefore, the algorithm (shown in FIG. 8) for identifying interesting table-subsets by the TS-Weight metric has two steps: (a) Prune table-subsets not satisfying the given threshold using the TS-Cost metric (shown at 801, 802, 803, 804, 805, 806 and 807). (b) Prune the table-subsets retained in (a) that do not satisfy the given threshold using the TS-Weight metric (shown at 808, 809, and 810). Note that the efficiency gained by the algorithm is due to reduced CPU and memory costs by not having to renumerate all table-subsets.

In further detail, at 801, a table-subset $S_1$ is set equal to a table subset of size one, having a TS-Cost greater than or equal to the threshold C. i is also initialized to one. 802 and 807 for a while loop when i is less than MAX-TABLES and the size of the table-subset is greater than zero. i is incremented at 803, and the subset Si is initialized to the empty set. At 804, G is defined as a table-subset of size i, and s is defined as an element of $S_i$–1 such that s is a subset of T. 805–806 add a table subset of size i if the cost is greater than or equal to C. 808 defines S as a union of all $S_i$. At 809, R is defined as the subsets in S that have a weight greater than or equal to C. The threshold C may be different for cost and weight as desired.

In FIG. 8, the size of a table-subset T is defined to be the number of tables in T. MAX-TABLES is the maximum number of tables referenced in any query in the workload. A lower threshold C leads to a larger space being considered and vice versa. Based on experiments on various databases and workloads, using C equal to approximately 10% of the total workload cost had a negligible negative impact on the solution compared to the case when there is no cut off (C=0), but was significantly faster. C may vary depending on the database and workload, and is not limited to a value of approximately 10%.

Exploiting Cost and Usage Information to prune the space of Syntactically Relevant Materialized Views The syntactically relevant materialized views proposed for a query are restricted to the set of interesting table-subsets found using the algorithm above. However, despite the significant pruning achieved by this algorithm, many syntactically relevant materialized views proposed may still be spurious for the query, i.e., not useful for the query. This is because the decision of whether or not a materialized view is useful for a query is made by the optimizer and is cost-based. The goal of pruning is to eliminate spurious materialized views from further consideration and select a smaller set of materialized views that need to be considered for enumeration. The algorithm is based on the intuition that if a materialized view is not part of the best solution for even a single query in the workload by itself, then it is unlikely to be useful for the workload in its entirety.

The pruning algorithm for selecting the "interesting" materialized views for a workload, shown in FIG. 4, works on a per-query basis. At 401, S is defined as the set of materialized views of interest for the workload W. At 402, S is set to empty. A loop based on i is defined starting at 403. At 404, syntactically relevant materialized views only on table-subsets referenced in query $Q_i$ that are part of the "interesting" table-subsets are proposed. For each such table-subset, a materialized view involving tables in that subset along with join and selection conditions (if any) on those tables are proposed. As noted earlier, it is possible to propose additional materialized views on the same table-subset that include only a subset of the conditions in the query, since they are more general, and hence may apply to other queries in the workload. However, in one embodiment, this aspect of exploiting commonality across queries in the workload is handled via materialized view merging which is described in further detail below. For each materialized view proposed, a set of clustered and non-clustered indexes on the materialized view is also proposed At 405, C is set equal to the Best-Configuration (Q, M), where Q is a query and M is a set of syntactically relevant materialized views for Q that returns the best configuration for Q from the given set of materialized views (and indexes on materialized views). The candidate index selection algorithm, has the important property that the choice of the best configuration for a query is cost-based, i.e., it is the configuration that the optimizer estimates as having the lowest cost. Any suitable method can be used in this function. In one embodiment, a Greedy (m,k) algorithm as previously described may be used. In a further embodiment, the optimizer is used to provide a plan, and the materialized views mentioned in the plan will be selected. The candidate selection algorithm dramatically reduces the number of materialized views that enters enumeration. Finally, by picking more than one configuration for a query at 405, quality (particularly in the presence of updates in the workload) is improved at the expense of increased running time. However, in conjunction with materialized view merging techniques presented below, selecting one configuration per query rarely compromises the quality of the final recommendation.

Materialized View Merging

An important aspect of selecting materialized views of interest is that materialized views are considered and selected on a per-query basis. However, considering a space of materialized views that services multiple queries at once can be more beneficial, particularly in the presence of updates and storage constraints. The following two examples highlight the importance of exploiting commonality across queries.

EXAMPLE 4

Consider a workload consisting of the following two queries $Q_1$ and $Q_2$ that are similar to one another except that they differ in the Group By columns:

$Q_1$: select $T_1.a$, $T_2.d$, sum ($T_2.e$) from $T_1$, $T_2$ where $T_1.c=T_2.c$ and $T_1.b=10$ group by $T_1.a$, $T_2.d$ $Q_2$: select $T_1.a$, $T_2.c$, sum ($T_2.e$) from $T_1$, $T_2$ where $T_1.c=T_2.c$ and $T_1.b=10$ group by $T_1.a$, $T_2.c$ In one embodiment, materialized views $V_1$ (=$Q_1$) and $V_2$ (=$Q_2$) would be proposed, and these materialized views would be selected in the candidate selection step. However, consider the following materialized view $V_{12}$ obtained by "merging" the materialized views $V_1$ and $V_2$:

$V_{12}$: select $T_1.a$, $T_2.d$, $T_2.c$ sum ($T_2.e$) from $T_1$, $T_2$ where $T_1.c=T_2.c$ and $T_1.b=10$ group by $T_1.a$, $T_2.d$, $T_2.c$ $V_{12}$ would never have been proposed by examining either $Q_1$ or $Q_2$ alone. Using $V_{12}$ both $Q_1$ and $Q_2$ and be answered, although Cost ($Q_1$,$\{V_{12}\}$)>Cost ($Q_1$, $\{V_1\}$) and Cost ($Q_1$,$\{V_{12}\}$)>Cost ($Q_1$, $\{V_2\}$). However, if the allotted storage is sufficient for $V_{12}$, but not sufficient for both $V_1$ and $V_2$, then $V_{12}$ could be the optimal recommendation for the above workload. Similarly, if the workload consists of updates, then $\{V_{12}\}$ could be superior to $\{V_1, V_2\}$.

EXAMPLE 5

Consider the following queries $Q_3$ and $Q_4$ that differ in the constants used in the selection condition and in the projection columns.

$Q_3$: select $T_1.a$, sum ($T_2.e$) from $T_1$, $T_2$ where $T_1.c=T_2.c$ and $T_1.b=10$ group by $T_1.a$ $Q_4$: select $T_1.a$, sum ($T_2.f$) from $T_1$, $T_2$ where $T_1.c=T_2.c$ and $T_1.b=20$ group by $T_1.a$ Once again materialized views V3 (=Q3) and V4=(Q4) are optimal for the respective queries, and would be picked as candidates. However, for the same reasons as in the previous example, the following materialized view $V_{34}$, may be superior in the presence of updates or storage constraints:

$V_{34}$: select $T_1.a$, sum ($T_2.e$), sum ($T_2.f$) from $T_1$, $T_2$ where $T_1.c=T_2.c$ group by $T_1.b$, $T_1.a$ From the above two examples it can be seen that it is necessary to consider a space of materialized views that even though are not optimal for any individual query, can be beneficial for multiple queries in the workload. However, proposing a set of syntactically relevant "merged" materialized views for the workload by analyzing multiple queries at once could lead to an explosion in the number of materialized views proposed. The present invention an alternative approach that is scalable and is based on the following observation: unlike a syntactically relevant materialized view that may or may not be useful for a query, every materialized view selected by the algorithm in FIG. 4 is useful for at least one query in the workload. Materialized view merging is therefore restricted to the above set of materialized views. The newly generated set of merged materialized views is then passed along with the materialized views identified by the algorithm in FIG. 4, into enumeration, which produces the final result.

Algorithm for Materialized View Merging

As described above, the goal of materialized view merging is to generate an additional set of "interesting" materialized views from a given set of materialized views which are likely to be used. This additional set of materialized views is obtained using a sequence of pair-wise merges starting with the set C. Merging of materialized views is guided by the following two rules:

Rule 1: Merge pairs of materialized views that have the same tables, join and selection conditions. Thus, materialized views that differ only in their Group By clauses and/or projection columns can be merged by this rule, which results in an expansion of the Group By and projection columns (see Example 4).

Rule 2: Merge pairs of materialized views that have different selection conditions but matching Group By and join conditions. Thus, materialized views that differ only in their selection conditions can be merged by this rule, which results in dropping of the selection conditions and expansion of the projection columns. (see Example 5).

FIG. 5 shows pseudocode generally at 500 for merging materialized views. It proceeds in two steps. First, the matching rule is applied at 501 on the given set C until no more additional merged materialized views are possible as indicated at 502, 503, 504, 505, 506 and 507. Set S is returned. Second, Rule 2 is applied to the given set C∪S at 508, 509, 510, 511, 512, 513, and 514 until no more merged materialized views are possible. Note that it is possible for a merged materialized view picked at 506 to be merged again in a subsequent iteration of the loop. This allows more than two materialized views ∈ C to be combined into one merged materialized view in the final set S, even though the merging is done pair wise. Also, although the number of new merged materialized views created by this algorithm can be exponential in the size of C in the worst case, in practice, much fewer merged materialized views are generated. This is because (a) Not all pairs of materialized views at 503 and 509 will match since they may not meet the restrictions imposed by the respective Rules. (b) MergeViewPair eliminates materialized views whose size is significantly higher than the size of its largest "base" parent. Optionally, the output of the materialized view-merging algorithm can be fed into the pruning algorithm in FIG. 4 to prune out the merged materialized views that are not used in any query. These merged materialized views, combined with the likely to be used materialized views comprise the candidate materialized views and the candidate indexes are fed into the joint enumeration scheme.

Merging a Pair of Materialized Views

The goal of a MergeViewPair algorithm is to generate a new "merged" materialized view V from a given pair of materialized views from the same class and core, $V_1$ and $V_2$. $V_1$ and $V_2$ are referred to as the parent materialized views and $V_{12}$ as the merged materialized view. The materialized views are merged using one of the Rules presented above. The intuition behind these two rules is to ensure that the merged materialized view generated is "similar" to both input materialized views, thereby retaining most of the attractiveness of $V_1$ and $V_2$.

FIGS. 6 and 7 respectively illustrate the MergeViewPair algorithm applied to each matching rule. When a merged materialized view is generated, it is possible that the size of the merged materialized view is significantly higher than the "base" parents from which it is derived. The "base" parents of a materialized view are the ones obtained by recursively getting the parents of a materialized view until one is reached with no parents. The goal of 603 and 703 in the MergeViewPair algorithms is to eliminate merged materialized views from being generated that are likely to be "much less useful" than both its parents. This size increase threshold (denoted by x) can be determined by the user. In one embodiment, a value of x=1.35 is used over a variety of databases and workloads.

Note that MergeviewPair requires the estimation of the size of a materialized view. One way to estimate the size of a materialized view is to obtain an estimate of the number of rows in the materialized view definition from the query optimizer, and multiply this with the total width of all columns in the materialized view. The accuracy of such estimation depends on the availability of an appropriate set of statistics for query optimization. This method requires invoking the optimizer once f or each merged materialized view considered, and this cost can be significant. Alternatively, less expensive heuristic techniques can be used for materialized view size estimation. Other techniques, can be used in more restricted multidimensional scenarios.

Alternative View Merging Embodiment

If the materialized views that enter configuration enumeration are limited to the ones elected by using the query optimizer to prune syntactically relevant materialized views, sub-optimal recommendations may be obtained for the workload when storage is constrained. This observation suggests that the space of materialized views need to be considered that although are not optimal for any individual query, are useful for multiple queries, and therefore may be optimal for the workload. However, proposing such a set of syntactically relevant materialized views by analyzing multiple queries at once could lead to an explosion in the number of merged materialized views proposed. Instead, based on the observation that M, the set of materialized views returned by pruning syntactically relevant views, contains materialized views selected on a cost-basis and are therefore very likely to be used by the query optimizer. This set M is therefore a good starting point for generating additional "merged" materialized views that are derived by exploiting commonality among views in M. The newly generated set of merged views, along with M, are candidate materialized views. This approach is significantly more scalable than the alternative of generated merged views starting from all syntactically relevant materialized views.

An important issue in view merging is characterizing the space of merged views to be explored. This space is explored using a sequence of pair-wise merges. Two issues that are addressed are: (1) determining the criteria that govern when and how a given pair of views is merged (FIG. 9), and (2) enumerating the space of possible merged views (FIG. 10). The algorithm for merging a pair of views needs to recognize the fact that views (unlike indexes) are multi-table structures that may contain selections, grouping and aggregation.

These differences significantly influence the way in which a given pair of views is merged.

The goal when merging a given pair of views, referred to as the parent views, $v_1$, and $v_2$, is to generate a new view, called the merged view. The term "parent views" is also used to refer to potential parent views prior to the actual merger of the views for convenience. The merged view has the following two properties. First, all queries that can be answered using either of the parent views should be answerable using the merged view. Second, the cost of answering these queries using the merged view should not be significantly higher than the cost of answering the queries using views in M (the set via finding interesting table-subsets in the workload). The algorithm for merging a pair of views, called MergeViewPair, is shown in FIG. 9. Intuitively, the algorithm achieves the first property by structurally modifying the parent views as little as possible when generating the merged view, i.e., by retaining the common aspects of the parent views and generalizing only their differences. For simplicity, the algorithm for SPJ (select projection join) views with grouping and aggregation, where the selection conditions are conjunctions of simple predicates. The algorithm can be generalized to handle complex selection conditions as well as account for differences in constants between conditions on the same column.

Note that a merged view $v_{12}$ may be derived starting from views in M through a sequence of pair-wise merges. At 901, two parent materialized views are identified that reference the same tables and the same join conditions. At 902, selection conditions that appear in a first parent view but not in a second are identified, as are selection conditions that appear in the second by not in the first.

The merger of the parent views is done at 903 by taking the union of the projection columns of the parent views, taking the union of the GROUP BY columns of the parent views, pushing the columns corresponding to the selection conditions from 902 into the GROUP BY clause of the merged view, and including selection conditions common to the parent views. We define Parent-Closure(v) as the set of views in M from which v is derived. Since a merged view may be further merged, their may be many materialized views in the final merged view being considered. At 904, the size of the merged view is compared to the size of the union of the parent-closure of the parent views times a threshold, x. If the size of the merged view is greater than x times the size of the smallest view in Parent-Closure($v_1$) Union Parent-Closure($v_2$), null is returned. If not, the merged view is returned at 905.

The comparison at 904 is done to achieve the second property mentioned above by preventing a merged view from being generated if it is much larger than the views in Parent-Closure(v). The value of the size increase threshold (x) may be empirically determined and depends on the database and workload. In an implementation on Microsoft SQL Server, setting x between approximately one and approximately two works well over a variety of databases and workloads. Other values may also be used. With other systems, the values may also change, but should be set to prevent a merged view from being generated if it is much larger than the views in Parent-Closure(v).

At 904, MergeViewPair requires estimating the size of a materialized view. One way to achieve this is to obtain an estimate of the view size from the query optimizer. The accuracy of such estimation depends on the availability of an appropriate set of statistics for query optimization. Alternatively, less expensive heuristic techniques may be used for more restricted multidimensional scenarios.

One algorithm for generating a set of merged views from a given set of views is shown in FIG. 10. As mentioned earlier, this algorithm is invoked with the set of materialized views M obtained as previously described. Note that it is possible for a merged materialized view generated at 1003 to be merged again in a subsequent iteration of the outer loop (1002, 1003, 1004, 1005, 1006 and 1007). This allows more than two views in M to be combined into one merged view even though the merging is done pair-wise. Second, although the number of new merged views explored by this algorithm can be exponential in the size of M in the worst case, fewer merged materialized views are explored in practice because of the checks built into 904 of MergeViewPair (FIG. 9). Third, the set of merged views returned by the algorithm does not depend on the exact sequence in which views are merged. Furthermore, the algorithm is guaranteed to explore all merged views that can be generated using any sequence of merges using MergeViewPair starting with the views in M. The algorithm in FIG. 10 has been presented in its current form for simplicity of exposition. Note however, that if views $v_1$ and $v_2$ cannot be merged to form $v_{12}$, then no other merged view derived from $v_1$ and $v_2$ is possible, e.g., $v_{123}$ is not possible. This observation is leveraged to increase efficiency by finding frequent itemsets in a known manner. Finally, merged views generated by this algorithm are ensured to be actually useful in answering queries in the workload, by performing a cost-based pruning using the query optimizer.

In further detail, at 1001, R is set to M. 1002 through 1007 are performed while the size of R is greater than one. At 1003, M' is defined as the set of merged views obtained by calling the MergeViewPair algorithm on each pair of views in R. If M' is empty at 1004, R-M is returned. Otherwise, M' is added to R at 1005. At 1006, if a view is an element of M', both parents are removed from R. R-M is then returned at 1008 after each set of merged views have been considered.

Trading Choices of Indexes and Materialized Views

Previous work in physical database design has considered the problems of index selection and materialized view selection in isolation. However, both indexes and materialized views are fundamentally similar—these are both redundant structures that speed up query execution, compete for the same resource—storage, and incur maintenance overhead in the presence of updates. Furthermore, indexes and materialized views can interact with one another, i.e., the presence of an index can make a materialized view more attractive and vice versa. In one embodiment of the present invention, joint enumeration of the space of candidate indexes and materialized views are considered.

There are two possible alternatives to the approach of jointly enumerating the space of indexes and materialized views. One alternative is to pick materialized views first, and then select indexes for the workload (this alternative is denoted as MVFIRST). The second alternative reverses the above order and picks indexes first, followed by materialized views (INDFIRST). In each case, if the global storage bound is S, then a fraction f ($0 \leq f \leq 1$) is determined such that a storage constraint of f*S is applied to the selection of the first feature set. For example, if indexes are picked first, and the total storage bound is 1GB, 500 MB may be allocated for indexes. After indexes are picked, all remaining storage can be used when picking materialized views; e.g. if the chosen indexes actually consumed only 400 MB, then materialized views can be picked with a storage constraint of 600 MB.

In the MVFIRST approach, a set of materialized views is first picked for the workload. Then indexes for the workload are selected subject to the materialized views that were picked earlier. The advantage of the MVFIRST approach over joint selection is potentially reduced running time since only limited interaction between indexes and materialized views is considered. In particular, interaction is limited to the set of materialized views picked and the set of candidate indexes. The drawback of this approach is that the selection of materialized views can adversely affect the quality of indexes picked. This is because for a given query, a materialized view is likely to be more beneficial than an index since an index is only an access path for reducing the number of rows (and columns in the case of a covering index) that need to be accessed from a table, whereas a materialized view can additionally pre-compute results of the query (via aggregations, grouping, joins etc.). Therefore, when materialized views are chosen first, they are likely to preclude selection of potentially useful candidate indexes.

In the INDFIRST approach, a set of indexes is picked first for the workload, followed by selection of materialized views, subject to the indexes that were picked earlier. The INDFIRST approach does not suffer from the problem described with respect to selecting materialized views first, since indexes are chosen first and therefore they are less likely to preclude choice of good candidate materialized views. However, this approach suffers from another problem (also relevant to MVFIRST)—How to determine the fraction f of the total storage bound to be allocated to indexes? In practice, the "optimal" fraction f depends on a variety of attributes of the workload including amount of updates, complexity of queries; and the absolute value of the total storage bound. With respect to both approaches, the optimal value of f may change from one workload to the next. Both INDFIRST and MVFIRST may provide redundant recommendations if the feature selected second is better for a query than the feature selected first, since the feature set selected first is fixed and cannot be back-tracked if a better solution is found later. It should be noted that either of these approaches may be used in conjunction with the previous method for selection of candidate indexes and candidate materialized views.

Joint Enumeration of Indexes and Materialized Views

The two attractions of joint enumeration of candidate and materialized views are: (a) A graceful adjustment to storage bounds, and (b) Considering interactions between candidate indexes and materialized views that are not possible in the other approaches. For example, if the optimal recommendation for a query Q consists of an index $I_1$ a materialized view V with a combined cost reduction of 100 units, but each structure by itself gives a cost reduction of 25 units for Q, then using the alternative INDFIRST, the optimal recommendation $\{I_1, V\}$ will not have occurred if another index $I_2$ reduces cost of Q by 30 units since $I_2$ would eliminate $I_1$. As previously mentioned, in one embodiment, a Greedy (m, k) algorithm is used for enumeration. This algorithm allows the treatment of indexes, materialized views and indexes on materialized views on the same footing. Details of the Greedy (m,k) algorithm are provided in "Database System Index Selection Using Index Configuration Enumeration for a Workload" U.S. Pat. No. 5,913,207 which has been previously incorporated by reference. Other algorithms may also be used provided they allow the treatment of indexes and materialized views on the same footing.

Proposing Indexes on materialized Views

A method for proposing a set of materialized views and indexes was described above. This section further describes a method of proposing indexes on materialized views. Such indexes on materialized views may be added to the set of candidate indexes and materialized views, and enumerated on the same footing as above to provide a set or proposed indexes, materialized views and indexes on materialized views.

Both clustered and non-clustered indexes may be defined on any materialized view as indicated in the flowchart of FIG. 11. A clustered index on a sequence of column(s) of a materialized view V physically orders the rows in the materialized view by the column(s) on which the index is defined. A clustered index can be very beneficial in answering queries that require ordered access to the rows in V based on any leading prefix of the columns in the clustered index on V.

In a first example, using a clustered index, let V be a materialized view that has a clustered index on columns ($C_1$, $C_2$). Then, for example, the following queries can be answered very efficiently using the clustered index, since these queries can be answered by sequentially accessing the rows in the materialized view: (i) A query that retrieves all rows having a value of $c_1$ between 10 and 20. (ii) A query that orders rows from the table by ($c_1$) or ($c_1$, $c_2$). In this example, every materialized view is required to have exactly one clustered index. In other examples, the materialized view need not have a clustered index.

In contrast, a materialized view can have zero or more non-clustered indexes on it. As with a clustered index, a non-clustered index on a materialized view may be useful for answering queries that have conditions on the column(s) in the index.

In a second example, using a non-clustered index, let V be a materialized view with a clustered index on column c1 and a non-clustered index on column $C_2$. Then a query that accesses all rows in V having a value of $C_2=10$ may be efficiently answered using the non-clustered index on $c_2$. Note that unlike a clustered index, a non-clustered index provides random access to the rows in v, and is typically less efficient than a clustered index. However, as mentioned earlier, in one embodiment, a given materialized view can have only one clustered index, whereas it may have multiple non-clustered indexes. Note that even if the query does not directly reference a materialized view V, the query optimizer may still be able to use the materialized view to answer the query.

A set of syntactically relevant materialized views for a query in the workload is provided above as indicated at 1110. For each syntactically relevant materialized view proposed for a query Q, a clustered index on columns of a key of the materialized view is proposed at 1120. All indexes on M are proposed on one or more projection columns of M. The following indexes on M are proposed for query Q:

1. Clustered index. In one embodiment, the clustered index on a view is unique, i.e., the columns of the clustered index form a key of the view. A key of the view is a set of columns in the projection list of the view such that each row in the view has a unique value in the (combination of) columns of the key. A clustered index is therefore proposed on the columns in the key of the view on M. If there is more than one key, an arbitrary key is selected. The order of columns in the clustered index is determined by ranking the indexable columns of Q that are part of the projection list of M and choosing the columns in ranked order at 1130. The ranks are assigned to columns depending on how the columns are referenced in the query. One form of ranking comprises:
   a. Columns that appear in selection conditions in Q
   b. Columns that appear in join conditions in Q
   c. Columns that appear in the order by clause in Q
   d. Columns that appear in the group by clause in Q
   e. Columns that appear in the projection list of Q In each case, only columns belonging to one or more tables referenced in M are considered. Columns in a-d above are referred to as indexable columns for query Q.

2. Propose a single column non-clustered index on each projection column in M such that the column is an indexable column for Q at 1140.

3. Propose one multi-column non-clustered index on all columns that appear in selection conditions in Q at 1150.

4. Propose one multi-column non-clustered index on all columns that appear in join conditions in Q at 1150.
5. If the clustered index has k columns in it, propose an additional (k−1) multi-column non-clustered indexes such that in each index, the leading column of the index is a different column at 1150.

After all materialized views for the query and all indexes on each materialized view have been proposed as indicated at 1160, the optimizer is used to indicate which materialized views and indexes on them would be used to answer the query as described above at 1170 and control is returned at 1190. The indexes on the materialized views chosen by the query optimizer are the candidates that make it into the configuration enumeration phase described above. If one of the indexes proposed above is used to answer the query, but the clustered index is not, then, the clustered index is changed so that it has the permutation of columns in the chosen index. The process is repeated as each query is generated. By restricting the number of clustered indexes proposed per materialized view to one, the candidates for the query may be found in one optimizer call, which enhances the scalability of a tool implementing these methods.

In a third example of indexes proposed on a materialized view, let Q be the query:

SELECT P.ProductName, Sum(S.Sales) FROM Products P, Sales_Data S
WHERE P.PID=S.PID AND S.Year='1999'
AND P.ProductType='Clothes'
GROUP BY P.ProductName.

Let $M_1$ be one of the materialized views that are proposed for the query Q:

SELECT .ProductType, S.Year, P.ProductName, Sum (S.Sales)
FROM Products P, Sales_Data S WHERE P.Product ID=S.Product ID
GROUP BY P.ProductType, S.ear, P.ProductName The key for $M_1$ comprises three columns, (ProductType, Year, ProductName). The clustered index proposed for $M_1$ is on (ProductType, Year, ProductName) since there are selection conditions on ProductType and Year in Q. A single-column non-clustered index on (Year) is also proposed on $M_1$. In addition, non-clustered indexes on (Year, ProductType, ProductName) and (ProductName, ProductType, Year) are also considered.

Let $M_2$ be the following materialized view that is also proposed for Q:

SELECT S.Year, S.PID, Sum(S.Sales)
FROM Sales_Data S
GROUP BY S.Year, S.PID

The key for $M_2$ is (Year, PID), and hence the clustered index proposed on $M_2$ is (Year, PID). In addition, a single-column index on (PID) is also proposed since PID occurs in a join condition in Q that joins with a table not referenced in $M_2$ (i.e., the Products table). Finally, a multi-column index on (PID, Year) is also considered on $M_2$.

Indexes on merged materialized views are also proposed in FIG. 1210. As previously described, an important part of candidate materialized view selection is generation of "merged" materialized views by combining materialized views that are likely to be used by the query optimizer to answer queries in the workload. The merged views are received from the merge materialized view algorithm or given from another source at 1210. Given two parent materialized views $M_1$ and $M_2$ (with indexes defined on them) at 1220, indexes on the merged materialized view $M_{12}$ are proposed. Note that $M_1$ and $M_2$ may themselves be merged materialized views. One property of the merge view pair algorithms described above is that all the columns that are projection columns in $M_1$ and $M_2$ are also projection columns in the merged materialized view $M_{12}$. Therefore, all the non-clustered indexes on $M_1$ and $M_2$ are also proposed on $M_{12}$ at 1220. It is thought that if a non-clustered index on $M_1$ (or $M_2$) was useful in answering a query, then the corresponding index on $M_{12}$ is also likely to be useful in answering the same query.

A clustered index is also proposed on $M_{12}$. The clustered index is proposed on a key of the merged materialized view. All columns from the projection list of a first parent view (say $M_1$) that are part of the key of $M_{12}$ are considered. The identified columns are ranked at 1240 as described for a clustered index on a materialized view. Projection columns from a second parent view ($M_2$) that are a part of the key of $M_{12}$ are then identified and ranked at 1250, and appended to the projection columns of the first materialized view at 1260 if distinct from the ranked projection columns of the first materialized view. The selection of which view to consider first is arbitrary in one embodiment. Other embodiments may give precedence to the parent view that is used by the optimizer to answer queries with a higher cumulative cost, or to give precedence to the parent view that has a higher benefit (i.e., reduction in cost) for the queries in which it is used by the optimizer.

The clustered index and the non-clustered indexes are combined and optionally provided to the optimizer at 1270. The indexes used by the optimizer for the workload are added to the candidate list and control is returned at 1290. The process may be repeated for each merged view Conclusion An index, materialized view and indexes on materialized views selection wizard produces a fast and reasonable recommendation of indexes, materialized views and indexes on materialized views which are beneficial given a workload for a given database. Candidate materialized views, indexes on materialized views and indexes are obtained, and a joint enumeration of the candidates is performed to obtain a recommended configuration. The configuration includes both indexes, materialized views and indexes on materialized views to provide a better recommendation which likely has less redundancy.

Materialized views are obtained by first determining subsets of tables that are referenced by queries in the workload. Uninteresting subsets are pruned or eliminated based on cost. The remaining subsets are then further pruned based on a table subset weight metric. These steps greatly reduce the number of materialized views to be considered, making the process of picking a new configuration faster.

Given the set of syntactically relevant materialized views, an optimizer is used for each query to obtain a set of materialized views that are likely to be used. Selected materialized views that are likely to be used are then merged, ensuring that all queries that can be answered using parent views, can also be answered with a merger of the parent vies, and that the cost of answering the queries using the merged view is not significantly higher than the cost of answering the queries using views in the set.

Indexes on the materialized views and merged materialized views are generated. Both clustered and non-clustered indexes are proposed and the indexes that are likely to be used are added to a set of candidate indexes on materialized views.

Enumeration of the candidate sets of indexes, materialized views and indexes on materialized views is then performed using a greedy algorithm as has been previously used with indexes alone. The same algorithm can be used to enumerate both indexes and materialized views.

This application is intended to cover any adaptations or variations of the present invention. It is manifestly intended that this invention be limited only by the claims and equivalents thereof.

What is claimed is:

1. A method of proposing indexes on a set of materialized views for a configuration to improve performance on a database workload, the method comprising:

for each materialized view for a query;
proposing a clustered index on columns of a key of the materialized view by ranking indexable columns of the query that are part of a projection list of the materialized view based on a manner in which the columns are referenced in the query;
proposing single and multi-column indexes for the query; and determining which indexes are likely to be used for the query.

2. The method of claim 1 wherein a query optimizer is called to determine which indexes are likely to be used for the query.

3. The method of claim 1 and further comprising repeating the method for each query in the workload to provide a list of candidate indexes.

4. The method of claim 3 and further comprising enumerating over a candidate set of indexes, materialized views, and indexes on materialized views to determine a recommended configuration for the database workload.

5. The method of claim 1 wherein ranking the indexable columns comprises selecting columns that appear in selection conditions of the query followed by selecting columns that appear in join conditions of the query.

6. The method of claim 1 wherein columns that appear in an ORDER BY clause are ranked ahead of columns that appear in a GROUP BY clause in the query.

7. The method of claim 1 wherein columns that appear in a projection list of the query are ranked last.

8. The method of claim 1 wherein only columns belonging to one or more tables referenced in the materialized view referenced in the query are ranked.

9. The method of claim 1 wherein columns are ranked in the order comprising:

columns that appear in selection conditions of the query;
columns that appear in join conditions of the query;
columns that appear in an ORDER BY clause of the query;
columns that appear in an GROUP BY clause of the query;
columns that appear in a projection list of the query; and
wherein only columns belonging to one or more tables referenced in the materialized views referenced in the query are ranked.

10. The method of claim 1 and further comprising proposing a multi-column non-clustered index on all columns that appear in selection conditions of the query.

11. The method of claim 1 and further comprising proposing a multi-column non-clustered index on all columns that appear in join conditions of the query.

12. The method of claim 1 and further comprising:

if the proposed clustered index has k columns in it, proposing an additional (k−1) multi-column non-clustered indexes such that in each index, the leading column of the index is a different column.

13. A computer readable medium having instructions stored thereon for causing a computer to perform a method of proposing indexes on a set of materialized views for a configuration to improve performance on a database workload, the method comprising:

for each materialized view for a query;
proposing a clustered index on columns of a key of the materialized view by ranking indexable columns of the query based on a manner in which the columns are referenced in the query that are part of a projection list of the materialized view;
proposing single and multi-column indexes for the query; and determining which indexes are likely to be used for the query.

14. The computer readable medium of claim 13 wherein a query optimizer is called to determine which indexes are likely to be used for the query.

15. The computer readable medium of claim 13 and further comprising instructions for repeating the method for each query in the workload to provide a list of candidate indexes.

16. The computer readable medium of claim 13 wherein columns are ranked in the order comprising:

columns that appear in selection conditions of the query;
columns that appear in join conditions of the query;
columns that appear in an ORDER BY clause of the query;
columns that appear in an GROUP BY clause of the query;
columns that appear in a projection list of the query; and
wherein only columns belonging to one or more tables referenced in the materialized views referenced in the query are ranked.

17. The computer readable medium of claim 13 and further comprising proposing a multi-column non-clustered index on all columns that appear in selection conditions of the query.

18. The computer readable medium of claim 13 and further comprising proposing a multi-column non-clustered index on all columns that appear in join conditions of the query.

19. The computer readable medium of claim 13 and further comprising:

if the proposed clustered index has k columns in it, proposing an additional (k−1) multi-column non-clustered indexes such that in each index, the leading column of the index is a different column.

20. A system that proposes indexes on a set of materialized views for a configuration to improve performance on a database workload, the system comprising:

a module that proposes a clustered index on columns of a key of a materialized view by ranking indexable columns of a query that are part of a projection list of the materialized view based on a manner in which the columns are referenced in the query;
a module that proposes single and multi-column indexes for the query; and
a module that determines which indexes are likely to be used for the query.

21. The system of claim 20 and further comprising a query optimizer that determines which indexes are likely to be used for the query.

22. The system of claim 20 wherein the modules operate on each query in the workload to provide a list of candidate indexes.

23. The system of claim 20 wherein columns are ranked in the order comprising:
   columns that appear in selection conditions of the query;
   columns that appear in join conditions of the query;
   columns that appear in an ORDER BY clause of the query;
   columns that appear in an GROUP BY clause of the query;
   columns that appear in a projection list of the query; and
   wherein only columns belonging to one or more tables referenced in the materialized views referenced in the query are ranked.

24. A method of proposing indexes on a set of materialized views for a configuration to improve performance on a database workload, the method comprising:
   for each materialized view for a query;
      proposing a clustered index on columns of a key of the materialized view by ranking indexable columns of the query that are part of a projection list of the materialized view based on a manner in which the columns are referenced in the query;
      proposing single and multi-column indexes for the query;
   determining which indexes are likely to be used for the query by calling a query optimizer; and
   adding such indexes to a list of candidate indexes.

25. The method of claim 24 wherein ranking the indexable columns comprises selecting columns that appear in selection conditions of the query followed by selecting columns that appear in join conditions of the query.

26. The method of claim 24 wherein columns that appear in an ORDER BY clause are ranked ahead of columns that appear in a GROUP BY clause in the query.

27. The method of claim 24 wherein columns that appear in a projection list of the query are ranked last.

28. The method of claim 24 wherein only columns belonging to one or more tables referenced in the set of materialized views are ranked.

29. The method of claim 24 wherein columns are ranked in the order comprising:
   columns that appear in selection conditions of the query;
   columns that appear in join conditions of the query;
   columns that appear in an ORDER BY clause of the query;
   columns that appear in an GROUP BY clause of the query;
   columns that appear in a projection list of the query; and
   wherein only columns belonging to one or more tables referenced in the materialized views referenced in the query are ranked.

30. The method of claim 24 and further comprising proposing a multi-column non-clustered index on all columns that appear in selection conditions of the query.

31. The method of claim 24 and further comprising proposing a multi-column non-clustered index on all columns that appear in join conditions of the query.

32. The method of claim 24 and further comprising:
   if the proposed clustered index has k columns in it, proposing an additional (k−1) multi-column non-clustered indexes such that in each index, the leading column of the index is a different column.

33. A computer readable medium having instructions stored thereon to cause a computer to perform a method of proposing indexes on a set of materialized views for a configuration to improve performance on a database workload, the method comprising:
   for each materialized view for a query;
      proposing a clustered index on columns of a key of the materialized view by ranking indexable columns of the query that are part of a projection list of the materialized view based on a manner in which the columns are referenced in the query;
      proposing single and multi-column indexes for the query; and
   determining which indexes are likely to be used for the query.

34. The computer readable medium of claim 33 and further comprising proposing a multi-column non-clustered index on all columns that appear in selection conditions of the query.

35. The computer readable medium of claim 33 and further comprising proposing a multi-column non-clustered index on all columns that appear in join conditions of the query.

36. The method of claim 33 and further comprising:
   if the proposed clustered index has k columns in it, proposing an additional (k−1) multi-column non-clustered indexes such that in each index, the leading column of the index is a different column.

37. The computer readable medium of claim 33 wherein ranking the indexable columns comprises selecting columns that appear in selection conditions of the query followed by selecting columns that appear in join conditions of the query.

38. The computer readable medium of claim 33 wherein columns that appear in an ORDER BY clause are ranked ahead of columns that appear in a GROUP BY clause in the query.

39. The computer readable medium of claim 33 wherein columns that appear in a projection list of the query are ranked last.

40. The computer readable medium of claim 33 wherein only columns belonging to one or more tables referenced in the materialized views referenced in the query are ranked.

41. The computer readable medium of claim 33 wherein columns are ranked in the order comprising:
   columns that appear in selection conditions of the query;
   columns that appear in join conditions of the query;
   columns that appear in an ORDER BY clause of the query;
   columns that appear in an GROUP BY clause of the query;
   columns that appear in a projection list of the query; and
   wherein only columns belonging to one or more tables referenced in the materialized views referenced in the query are ranked.

42. A system that proposes indexes on a set of materialized views for a configuration to improve performance on a database workload, the system comprising:
   means for proposing a clustered index on columns of a key of the materialized view by ranking indexable columns for a query that are part of a projection list of the materialized view based on a manner in which the columns are referenced in the query;
   means for proposing single and multi-column indexes for the query; and
   means for determining which indexes are likely to be used for the query.

43. A method of proposing indexes on a set of merged materialized views for a configuration to improve performance on a database workload, the method comprising:

for each merged materialized view for the workload;
identifying parent materialized views;
separately ranking columns of the parent materialized views that are part of a key of the merged materialized view;
appending the ranked columns of one of the parent views to the other to form a clustered index;
identifying non-clustered indexes on the parent materialized views;
defining corresponding non-clustered indexes on the merged materialized views; and
determining which indexes on merged materialized views are likely to be used for the query.

44. The method of claim 43 wherein a query optimizer is called to determine which indexes on merged materialized views are likely to be used for the query.

45. The method of claim 43 and further comprising repeating the method for each query in the workload to provide a list of candidate indexes on merged materialized views.

46. The method of claim 43 wherein columns are ranked in the order comprising:
columns that appear in selection conditions of the query;
columns that appear in join conditions of the query;
columns that appear in an ORDER BY clause of the query;
columns that appear in an GROUP BY clause of the query;
columns that appear in a projection list of the query; and
wherein only columns belonging to one or more tables referenced in the merged materialized views referenced in the query are ranked.

47. A computer readable medium having instructions stored thereon for causing a computer to perform a method of proposing indexes on a set of merged materialized views for a configuration to improve performance on a database workload, the method comprising:
for each merged materialized view for the workload;
identifying parent materialized views;
separately ranking columns of the parent materialized views that are part of a key of the merged materialized view;
appending the ranked columns of one of the parent views to the other to form a clustered index;
identifying non-clustered indexes on the parent materialized views;
defining corresponding non-clustered indexes on the merged materialized views; and
determining which indexes on merged materialized views are likely to be used for the query.

48. A method of proposing indexes on a set of merged materialized views for a configuration to improve performance on a database workload, the method comprising:
a module that identifies parent materialized views of a merged materialized view;
a module that separately ranks columns of the parent materialized views that are part of a key of the merged materialized view;
a module that appends the ranked columns of one of the parent views to the other to form a clustered index;
a module that identifies non-clustered indexes on the parent materialized views;
a module that defines corresponding non-clustered indexes on the merged materialized views; and
a module that determines which indexes on merged materialized views are likely to be used for the query.

49. A method of proposing candidate indexes on a set of materialized views and merged materialized views for a configuration to improve performance on a database workload, the method comprising:
for each materialized view for a query;
proposing a clustered index on columns of a key of the materialized view by ranking indexable columns of the query that are part of a projection list of the materialized view;
proposing single and multi-column indexes for the query;
proposing a clustered index on columns of a key of the materialized view by ranking indexable columns of the query that are part of a projection list of the materialized view;
proposing single and multi-column indexes for the query; and
independently determining which indexes on materialized views and indexes on merged materialized views are likely to be used for the query and adding them to the set of candidate indexes.

50. The method of claim 49 wherein a query optimizer is called to determine which indexes are likely to be used for the query.

51. The method of claim 49 and further comprising repeating the method for each query in the workload to provide a list of candidate indexes on merged materialized views.

52. The method of claim 49 wherein columns are ranked in the order comprising:
columns that appear in selection conditions of the query;
columns that appear in join conditions of the query;
columns that appear in an ORDER BY clause of the query;
columns that appear in an GROUP BY clause of the query;
columns that appear in a projection list of the query; and
wherein only columns belonging to one or more tables referenced in the materialized views referenced in the query or merged materialized views respectively are ranked.

53. A method of proposing indexes on a set of materialized views for a configuration to improve performance on a database workload, the method comprising:
for each materialized view for a query;
proposing a clustered index on columns of a key of the materialized view by ranking indexable columns of the query that are part of a projection list of the materialized view;
proposing single and multi-column indexes for the query; and determining which indexes are likely to be used for the query;
repeating the method for each query in the workload to provide a list of candidate indexes; and
enumerating over the candidate set of indexes, materialized views, and indexes on materialized views to determine a recommended configuration for the database workload.

54. A computer readable medium having instructions stored thereon to cause a computer to perform a method of proposing indexes on a set of materialized views for a configuration to improve performance on a database workload, the method comprising:
for each materialized view for a query;
proposing a clustered index on columns of a key of the materialized view by ranking indexable columns of the query that arc part of a projection list of the materialized view based on a manner in which the columns are referenced in the query;

proposing single and multi-column indexes for the query; and wherein if the proposed clustered index has k columns in it, proposing an additional (k−1) multi-column non-clustered indexes such that in each index, the leading column of the index is a different column; and determining which indexes are likely to be used for the query.

* * * * *